(12) United States Patent
Gevay

(10) Patent No.: US 6,910,565 B2
(45) Date of Patent: Jun. 28, 2005

(54) AUTOMATIC GEAR SHIFTING DEVICES AND METHODS THEREOF FOR VEHICLES

(76) Inventor: Frank M. Gevay, 1000 Caballo Blvd., Henderson, NV (US) 89014

( * ) Notice: Subject to any disclaimer, the term of this patent is extended or adjusted under 35 U.S.C. 154(b) by 0 days.

(21) Appl. No.: 10/628,944

(22) Filed: Jul. 30, 2003

(65) Prior Publication Data
US 2005/0023104 A1 Feb. 3, 2005

(51) Int. Cl.[7] .............................................. B60K 41/26
(52) U.S. Cl. ...................... 192/220.1; 477/92; 74/473.2
(58) Field of Search ........................ 192/220.1; 477/92; 74/473.2

(56) References Cited

U.S. PATENT DOCUMENTS

| | | | | |
|---|---|---|---|---|
| 4,142,614 A | * | 3/1979 | Fujioka | 192/220.1 |
| 5,052,531 A | * | 10/1991 | Bota | 192/219.1 |
| 5,878,861 A | * | 3/1999 | Altherr et al. | 192/220.1 |
| 5,911,646 A | * | 6/1999 | Tsutsui et al. | 477/93 |
| 6,542,804 B2 | * | 4/2003 | Muratomi | 701/62 |

* cited by examiner

*Primary Examiner*—Saul Rodriguez
(74) *Attorney, Agent, or Firm*—Harry M. Weiss; Weiss, Moy & Harris, P.C.

(57) ABSTRACT

An automatic gear shifting device for a vehicle comprises a member coupled to a portion of a surface of the vehicle. An arm is pivotally coupled to a portion of the member. The arm is coupled to at least at least one actuator for providing reciprocating motion of the arm. A neutral gear positioning actuator is activated when a brake pedal of the vehicle is engaged, and a drive gear positioning actuator is activated when the brake pedal is disengaged. The arm is coupled to a transmission linkage shaft to provide shifting from drive gear to neutral gear when the brake pedal is engaged and shifting from neutral gear to drive gear when the brake is disengaged.

3 Claims, 3 Drawing Sheets

AUTOMATIC GEAR SHIFTING DEVICES AND METHODS THEREOF FOR VEHICLES

FIELD OF THE INVENTION

This invention relates generally to gear shifting devices for vehicles, and more specifically to, improved automatic gear shifting devices and methods thereof for vehicles to provide better fuel economy.

BACKGROUND OF THE INVENTION

In the past, numerous methods and devices have been suggested and used to improve the fuel economy of internal combustion engines. As technology has advanced the devices and methods have become more sophisticated. Improvements in fuel economy have spanned almost every component associated with the operation of a vehicle. For example, lubricants that make pistons operate more efficiently have been continuously improved, leading to greater fuel efficiency while driving.

Another approach has been to use electronic devices to efficiently control fuel intake into firing chambers. Cornacchia, U.S. Pat. No. 4,630,577, provides a device that senses the speed of a vehicle. When the vehicle's speed drops below a preset speed, the engine is stopped and when the vehicle's speed is raised above the preset speed, the engine starts up again. This device provides fuel economy during the period of time when the engine is turned off, but may use more fuel each time the engine is started up again.

Currently, there are no devices which take advantage of the lower idle speed of an engine when an engine is put into neutral gear. In principal, a consumer can improve fuel economy by shifting their gear into neutral while in an idling situation. However such action is not automatic for most vehicle drivers.

For the foregoing reasons, there is a need to provide improved automatic gear shifting devices and methods thereof for vehicles to provide better fuel economy. This invention provides devices for automatically shifting vehicles from drive gear into neutral gear when a brake is engaged. The resulting action results in improved fuel economy.

SUMMARY OF THE INVENTION

Accordingly, it is an object of this invention to provide improved automatic gear shifting devices for vehicles.

It is a further object of this invention to provide improved devices for automatically shifting vehicles from drive gear into neutral gear when a brake is engaged.

It is yet a still further object of this invention to provide methods for achieving improved fuel economy using improved devices for automatically shifting vehicles from drive gear into neutral gear when a brake is engaged.

PREFERRED EMBODIMENTS OF THE INVENTION

In accordance with one embodiment of this invention an automatic gear shifting device for a vehicle is disclosed. The automatic gear shifting device comprises, in combination: means for selectively shifting gears of the vehicle when a brake pedal of the vehicle is engaged; an arm having an end portion pivotally coupled to the shifting means for selectively shifting gears; and means for providing reciprocating motion coupled to a portion of the arm for moving the arm when the brake pedal is engaged.

A first linkage coupler is coupled to the arm. A transmission linkage cable is coupled to the first linkage coupler. A transmission shift stick of the vehicle is coupled to the transmission linkage cable so that the transmission shift stick shifts from drive gear to neutral gear when the brake pedal is engaged and from neutral gear to drive gear when the brake pedal is disengaged.

The selectively shifting gears means comprises a transmission linkage shaft and a member having an opening on a portion of a surface of the member, the opening of the member for receiving the transmission linkage shaft. The member has a multiplicity of holes on a portion of the surface of the member for coupling the member to a portion of a surface of the motor compartment of the vehicle.

The means for providing reciprocating motion comprises at least one actuator for moving the arm when the brake pedal is engaged. A pair of actuators comprises a neutral gear positioning solenoid and a drive gear positioning solenoid, the neutral gear positioning solenoid activated and the drive gear positioning solenoid deactivated when the brake pedal is engaged and the drive gear positioning solenoid activated and the neutral gear positioning solenoid deactivated when the brake pedal is disengaged. Alternatively, a brake pedal actuator comprises the arm coupled to a first linkage coupler, the brake pedal coupled to a second linkage coupler and one end of a brake linkage cable coupled to the first linkage coupler and an opposite end of the brake linkage cable coupled to the second linkage coupler so that the arm moves when the brake pedal is engaged; a second actuator comprises a drive gear positioning solenoid; the brake pedal actuator shifted to a neutral gear position and the drive gear positioning solenoid deactivated when the brake is engaged and the drive gear positioning solenoid activated and the brake pedal actuator shifted to a drive gear position when the brake is disengaged.

A retainer coupled to a wall of the vehicle separates a portion of a passenger compartment of the vehicle and a portion of a motor compartment of the vehicle, the retainer coupled to a portion of a surface of the brake linkage cable for maintaining the portion of the surface of the brake linkage cable in the wall.

In accordance with a second embodiment of this invention an automatic gear shifting device for a vehicle comprises, in combination: a transmission linkage shaft for shifting gears of the vehicle; a member coupled to a portion of a surface of a motor compartment of the vehicle, the member having an opening for receiving the transmission linkage shaft; an arm having an end portion pivotally coupled to the transmission linkage shaft for shifting from drive gear to neutral gear when a brake pedal is engaged; at least one actuator for providing reciprocating motion, the at least one actuator coupled to the arm for moving the arm when the brake pedal is engaged.

A first linkage coupler is coupled to the arm. A transmission linkage cable is coupled to the first linkage coupler. A transmission shift stick of the vehicle is coupled to the transmission linkage cable so that the transmission shift stick shifts from drive gear to neutral gear when the brake pedal is engaged and from neutral gear to drive gear when the brake pedal is disengaged. The member has a multiplicity of holes on a portion of the surface of the member for coupling to the portion of the surface of the motor compartment of the vehicle.

The automatic gear shifting device further comprises a pair of actuators comprising a neutral gear positioning solenoid and a drive gear positioning solenoid, the neutral gear positioning solenoid activated and the drive gear positioning solenoid deactivated when the brake pedal is engaged and the drive gear positioning solenoid activated and the neutral gear positioning solenoid deactivated when the brake pedal is disengaged. Alternatively the automatic gear shifting device further comprises a brake pedal actuator comprising the arm coupled to a first linkage coupler, the brake pedal coupled to a second linkage coupler and one end of a brake linkage cable coupled to the first linkage coupler and an opposite end of the brake linkage cable coupled to the second linkage coupler so that the arm moves when the brake pedal is engaged; a second actuator comprising a drive gear positioning solenoid; the brake pedal actuator shifted to a neutral gear position and the drive gear positioning solenoid deactivated when the brake is engaged and the drive gear positioning solenoid activated and the brake pedal actuator shifted to a drive gear position when the brake is disengaged.

In accordance with a third embodiment of this invention a method for achieving improved fuel economy of a vehicle is disclosed. The method comprises the steps of providing means for selectively shifting gears of the vehicle when a brake pedal of the vehicle is engaged; providing an arm having an end portion pivotally coupled to the means for selectively shifting gears; and providing reciprocating motion means, the reciprocating motion means coupled to the arm for moving the arm when the brake pedal is engaged.

The method further comprises providing a first linkage coupler coupled to the arm; providing a transmission linkage cable coupled to the first linkage coupler; providing a transmission shift stick of the vehicle coupled to the transmission linkage cable; and shifting the transmission shift stick from drive gear to neutral gear when the brake pedal is engaged and from neutral gear to drive gear when the brake pedal is disengaged.

The method further comprises providing the means for selectively shifting gears comprises a transmission linkage shaft; and providing a member having an opening on a portion of a surface of the member, the opening of the member for receiving the transmission linkage shaft.

The method further comprises providing the member having a multiplicity of holes on a portion of the surface of the member; and coupling the member to a portion of a surface of a motor compartment of the vehicle.

The reciprocating motion means comprises at least one actuator for moving the arm when the brake pedal is engaged. The method further comprises providing a pair of actuators comprising a neutral gear positioning solenoid and a drive gear positioning solenoid; activating the neutral gear positioning solenoid and deactivating the drive gear positioning solenoid when the brake pedal is engaged; and activating the drive gear positioning solenoid and deactivating the neutral gear positioning solenoid when the brake pedal is disengaged.

The method further comprises providing a brake pedal actuator comprising the arm coupled to a first linkage coupler, the brake pedal coupled to a second linkage coupler and one end of a brake linkage cable coupled to the first linkage coupler and an opposite end of the brake linkage cable coupled to the second linkage coupler so that the arm moves when the brake pedal is engaged; providing a second actuator comprising a drive gear positioning solenoid; shifting the brake pedal actuator to a neutral gear position and deactivating the drive gear positioning solenoid when the brake is engaged; and activating the drive gear positioning solenoid and shifting the brake pedal actuator to a drive gear position when the brake is disengaged.

The foregoing and other objects, features, and advantages of the invention will be apparent from the following, more detailed description of the preferred embodiments of the invention, as illustrated in the accompanying drawings.

DESCRIPTION OF THE INVENTION

Figure 1:
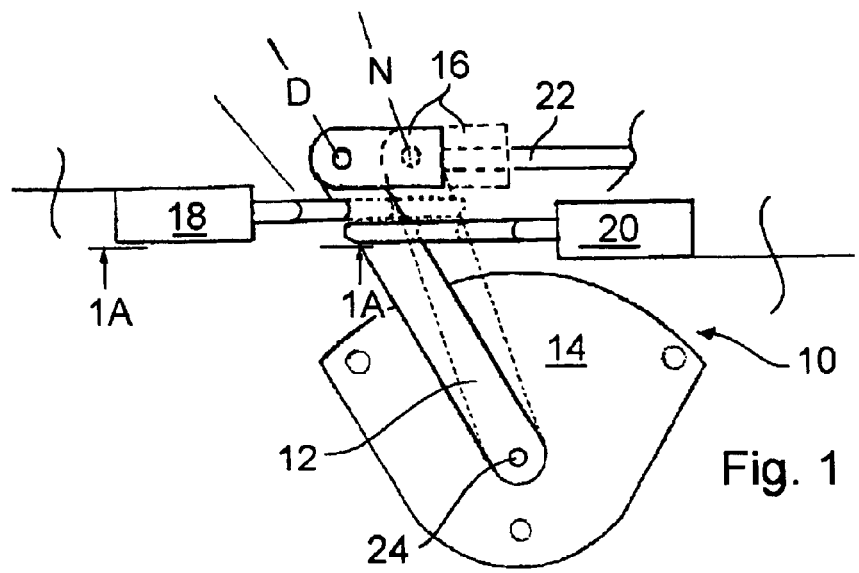
FIG. 1 is an elevation view of a portion of an automatic gear shifting device for a vehicle showing an arm and a first linkage coupler of the automatic gear shifting device in alternatively a drive gear position and a neutral gear position, in accordance with this invention.

In a first embodiment, according to FIG. 1, an automatic gear shifting device 10 for a vehicle comprises a member 14 which defines a multiplicity of openings for mounting the member 14 onto a portion of a surface of a motor compartment 42 of a vehicle. A portion of a surface of the member 14 defines a hole. A transmission linkage shaft 24, which is coupled to gears (not shown) of a vehicle transmission (not shown) passes through the hole. An end of an arm 12 is pivotally coupled to the transmission linkage shaft 24. A portion of the surface of the arm 12 is further coupled to a portion of a surface of a first linkage coupler 16. A portion of the surface of the first linkage coupler 16 is coupled to a transmission linkage cable 22, which is coupled to a transmission shift stick (not shown) in a portion of a passenger compartment 44 of the vehicle for moving the transmission shift stick from drive gear to neutral gear. A portion of the surface of the arm 12 is positioned between a pair of faces of a portion of a neutral gear positioning solenoid 18, when a brake pedal 48 is engaged (shown as dashed lines in FIG. 4). Alternatively, a portion of the surface of the arm 12 is positioned between a pair of faces of a drive gear positioning solenoid 20 when the brake pedal 48 is disengaged (shown as solid lines in FIG. 4). When the arm 12 is moved from the drive gear position (see "D" in FIG. 1) to a neutral gear position (see "N" in FIG. 1) the drive gear positioning solenoid 20 is deactivated and the neutral gear positioning solenoid 18 is activated. The neutral gear positioning solenoid 18 is coupled to switching circuitry (shown in FIG. 2). Similarly, the drive gear positioning solenoid 20 is coupled to switching circuitry (shown in FIG. 2).

Figure 1A:
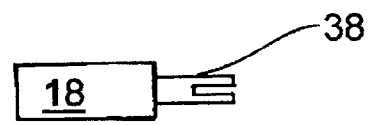
FIG. 1A is an elevation view along 1A—1A of a bottom portion of a neutral gear positioning solenoid that is engaged by the arm alternatively in the drive gear position and the neutral gear position of the portion of the automatic gear shifting device of FIG. 1.

FIG. 1A is an elevation view along 1A—1A of a bottom portion of the neutral gear positioning solenoid 18 in an extended position. During operation a portion of either one of the solenoids 18, 20 is engaged by a portion of the surface of the arm 12 of the automatic gear shifting device 10 of FIG. 1 alternatively in the neutral gear position ("N" in FIG. 1) or the drive gear position ("D" in FIG. 1). The first linkage coupler 16 coupled to the arm 12 moves synchronously with the arm 12 from the drive gear position ("D" in FIG. 1) to the neutral gear position ("N" in FIG. 1). When a portion of the surface of the arm 12 engages a back edge of an essentially U-shaped groove of a retractable extending portion 38 of either one of the solenoids 18 or 20, a portion of the circuit of FIG. 2 is activated.

Figure 2:
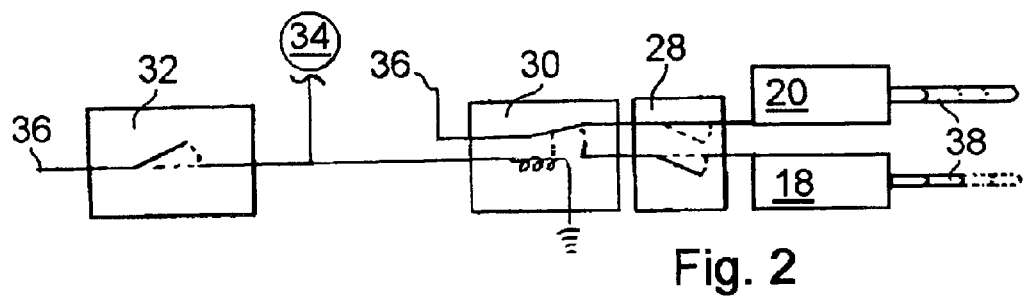
FIG. 2 is a schematic of switches coupled to the portion of the automatic gear shifting device of FIG. 1 for activating the vehicle's brake lights and switching from the drive gear position into the neutral gear position when a brake of the vehicle is engaged, and for deactivating switches to revert to the drive gear position when the brake is no longer engaged.
Figure 4:
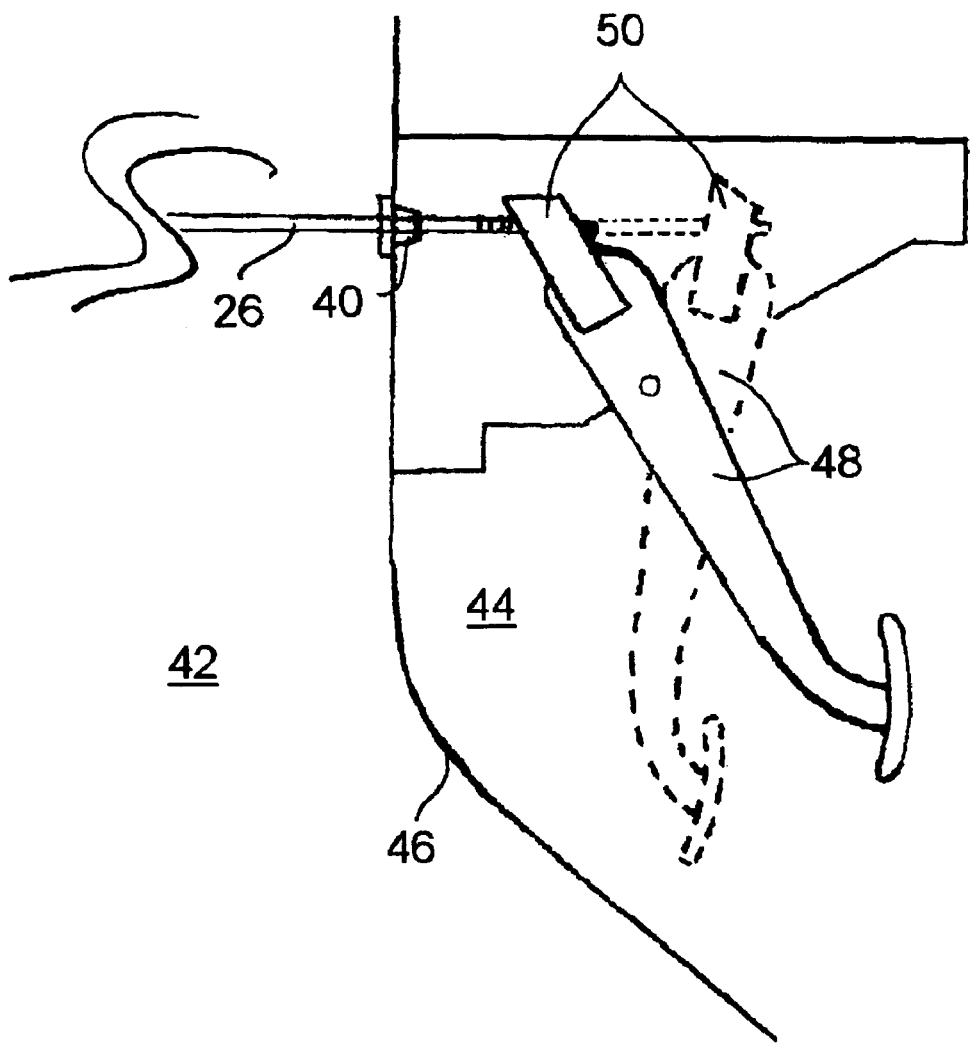
FIG. 4 is an elevation view of a brake pedal coupled to the portion of the automatic gear shifting device of FIG. 3 with the brake pedal shown in an unengaged position and with the brake pedal shown in an alternative engaged position.

Referring to FIG. 2, a brake light switch 32 coupled to battery leads 36 switches from an "off" position when the vehicle is in drive gear to an "on" position when the brake pedal 48 of the vehicle is engaged (shown as solid lines in FIG. 4). When the brake light switch 32 is in the "on" position, current passes to activate brake lights 34. Current continues to flow to a relay switch 30 and from the relay switch 30 to a neutral-to-drive switchbox 28 and from the neutral-to-drive switchbox 28 to the neutral gear positioning solenoid 18 repositioning the arm 12 to the neutral gear position (shown in dashed lines in FIG. 1), which results in rotation of the transmission linkage shaft 24 and shifting the vehicle transmission from drive gear to neutral gear. Synchronously, the first linkage coupler 16 coupled to both the arm 12 and the transmission linkage cable 22 repositions to the neutral gear position (shown as dashed lines in FIG. 1), resulting in the transmission shift stick (not shown) in a portion of the passenger compartment 44 to switch from drive gear to neutral gear.

When the brake pedal 48 of the vehicle is released, the brake light switch 32 switches to the "off" position, resulting in no current flowing to the neutral positioning solenoid 18. Instead current flows from the battery leads 36 to the relay switch 30 to the neutral-to-drive switchbox 28 and to the drive positioning solenoid 20 to engage and reposition the arm 12 to the drive gear position, which results in rotation of the transmission linkage shaft 24 and shifting the vehicle transmission from neutral gear to drive gear. Synchronously, the first linkage coupler 16 coupled to both the arm 12 and the transmission linkage cable 22 repositions to the drive gear position (shown as solid lines in FIG. 1), resulting in the transmission shift stick (not shown) in a portion of the passenger compartment 44 to switch from neutral gear to drive gear.

Figure 3:
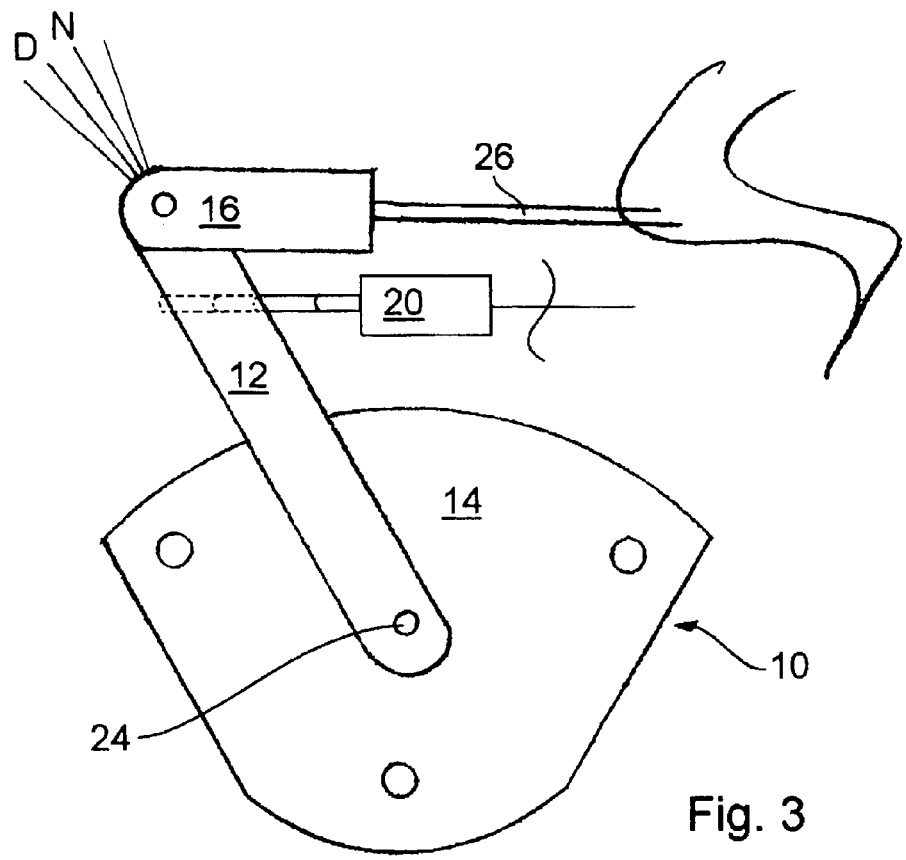
FIG. 3 is an elevation view of a portion of a second automatic gear shifting device with an arm and a first linkage coupler in the neutral gear position.

In a second embodiment, according to FIG. 3, an automatic gear shifting device 10 for a vehicle comprises a member 14 which defines a multiplicity of openings for mounting the member 14 onto a portion of a surface of a motor compartment 42 of a vehicle. A portion of a surface of the member 14 defines a hole. A transmission linkage shaft 24, which is coupled to gears (not shown) of a vehicle transmission (not shown) passes through the hole. An end of the arm 12 is pivotally coupled to the transmission linkage shaft 24. A portion of the arm 12 is positioned between a pair of faces of a drive gear positioning solenoid 20 when a brake pedal 48 is disengaged (shown as solid lines in FIG. 4). A portion of the surface of the arm 12 engages a back edge of an essentially U-shaped groove of a retractable extending portion 38 of the solenoid 20 to activate a portion of the circuit of FIG. 3A. A portion of the surface of the arm 12 is further coupled to a portion of a surface of a first linkage coupler 16. The first linkage coupler 16 is coupled to a transmission linkage cable 22 (not shown in FIG. 3), which is coupled to a transmission shift stick (not shown) in a portion of a passenger compartment 44 of the vehicle for moving the transmission shift stick from drive gear to neutral gear. The first linkage coupler 16 is also coupled to a brake linkage cable 26 at one end of the brake linkage cable 26. The brake linkage cable 26 is coupled to a portion of a surface of a second linkage coupler 50. A portion of the surface of the second linkage coupler 50 is coupled to a portion of the surface of the brake pedal 48 within the passenger compartment 44. The brake linkage cable 26 is coupled to a portion of a wall 46 separating the passenger compartment 44 and the motor compartment 44 using a retainer 40.

Figure 3A:
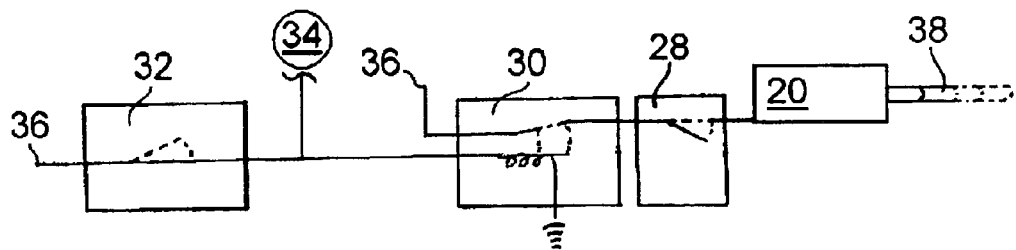
FIG. 3A is a schematic of switches coupled to the portion of the automatic gear shifting device of FIG. 3 for activating the vehicle's brake lights and switching from a drive gear position into a neutral gear position when a brake of the vehicle is engaged, and for deactivating switches to revert to the drive gear position when the brake is no longer engaged.

According to FIGS. 3, 3A and 4, when the brake pedal 48 is engaged (shown as dashed lines in FIG. 4), the brake linkage cable 26 (shown as dashed lines in FIG. 4) coupled to a portion of the surface of the second linkage coupler 50 (shown as dashed lines in FIG. 4) retracts to a neutral gear position. Since the first linkage coupler 16 is coupled to the brake linkage cable 26, the arm 12 moves from a drive gear position (shown as "D" in FIG. 3) to a neutral gear position (shown as "N" in FIG. 3), resulting in rotation of the transmission linkage shaft 24 and shifting of the vehicle transmission from drive gear to neutral gear. When the arm 12 is moved from the drive gear position (see "D" in FIG. 3) to the neutral gear position (see "N" in FIG. 3) the drive gear positioning solenoid 20 is deactivated. The drive gear positioning solenoid 20 is coupled to switching circuitry (shown in FIG. 3A).

Referring to FIG. 3A, a brake light switch 32 coupled to battery leads 36 switches from an "off" position when the vehicle is in drive gear to an "on" position when the brake pedal 48 of the vehicle is engaged. When the brake light switch 32 is in the "on" position, current passes to activate brake lights 34. Current continues to flow to a relay switch 30 and from the relay switch 30 to cut off a switch in a switchbox 28 leading to the drive positioning solenoid 20. The retractable extended portion of the solenoid 20 retracts to a neutral gear position.

Referring back to FIGS. 3 and 4, the first linkage coupler 16 coupled to both the arm 12 and the transmission linkage cable 22 (not shown), as well as, the second linkage coupler 50 (shown as dashed lines in FIG. 4) and the brake linkage cable 26 (shown as dashed lines in FIG. 4) reposition to the neutral gear position synchronously, resulting in the transmission shift stick (not shown) in a portion of the passenger compartment 44 to switch from drive gear to neutral gear.

When the brake pedal 48 of the vehicle is released (shown as solid lines in FIG. 4), the brake light switch 32 switches to the "off" position (shown as dashed lines in FIG. 3A). Current flows from the battery leads 36 to the relay switch 30, which turns the switch in the switchbox 28 to "on" (shown as dashed lines in FIG. 3A) and causes the drive positioning solenoid 20 to engage (shown as dashed lines in FIGS. 3 and 3A) and reposition the arm 12 to the drive gear position ("D" in FIG. 3). Both the brake linkage cable 26 and the second linkage coupler 50 coupled to the brake linkage cable 26 (shown as solid lines in FIG. 4) return to the drive gear position. Since the first linkage coupler 16 is coupled to the brake linkage cable 26, the arm 12 moves from the neutral gear position (shown as "N" in FIG. 3) to the drive gear position (shown as "D" in FIG. 3) when the drive positioning solenoid 20 re-engages the arm 12, resulting in rotation of the transmission linkage shaft 24 and shifting the vehicle transmission from neutral gear to drive gear. The first linkage coupler 16 coupled to both the arm 12 and the transmission linkage cable 22 (not shown), as well as, the second linkage coupler 50 (shown as solid lines in FIG. 4) and the brake linkage cable 26 (shown as solid lines in FIG. 4) reposition to the drive gear position synchronously, resulting in the transmission shift stick (not shown) in a portion of the passenger compartment 44 to switch from neutral gear to drive gear.

In summary, an automatic gear shifting device for a vehicle comprises a member coupled to a portion of a surface of the vehicle. An arm is pivotally coupled to a portion of the member. The arm is coupled to at least one actuator for providing reciprocating motion of the arm. A neutral gear positioning actuator is activated when a brake pedal of the vehicle is engaged, and a drive gear positioning actuator is activated when the brake pedal is disengaged. The arm is coupled to a transmission linkage shaft to provide shifting from drive gear to neutral gear when the brake pedal is engaged and shifting from neutral gear to drive gear when the brake is disengaged.

While the invention has been particularly shown and described with reference to preferred embodiments thereof, it will be understood by those skilled in the art that the foregoing and other changes in form and details may be made therein without departing from the spirit and scope of the invention. For example, mechanical equivalents such as springs and other types of actuators may replace solenoids. Other types of circuit diagram schemes may be used that provide equivalent results. The actuator may be an integral structure providing both neutral gear positioning and drive gear positioning.

What is claimed is:

1. An automatic gear shifting device for a vehicle comprising, in combination:
    means for selectively shifting gears of the vehicle when a brake pedal of the vehicle is engage;
    an arm having an end portion pivotally coupled to said shifting means for selectively shifting gears;
    means for providing reciprocating motion coupled to a portion of said arm for moving said arm when the brake pedal is engaged, said means for providing reciprocating motion comprising at least one actuator for moving said arm when the brake pedal is engaged; and
    a pair of actuators, said pair of actuators comprising a neutral gear positioning solenoid and a drive gear positioning solenoid, said neutral gear positioning solenoid activated and said drive gear positioning solenoid deactivated when the brake pedal is engaged and said drive gear positioning solenoid activated and said neutral gear positioning solenoid deactivated when the brake pedal is disengaged.

2. An automatic gear shifting device for a vehicle comprising, in combination:
    a transmission linkage shaft for shifting nears of the vehicle: a member coupled to a portion of a surface of a motor compartment of the vehicle, said member having an opening for receiving said transmission linkage shaft;
    an arm having an end portion pivotally coupled to said transmission linkage shaft for shifting from drive gear to neutral gear when a brake pedal is engaged:
    at least one actuator for providing reciprocating motion, said at least one actuator coupled to said arm for moving said arm when the brake pedal is engaged; and
    a pair of actuators; said pair of actuators comprising neutral gear positioning solenoid and a drive gear positioning solenoid, said neutral gear positioning solenoid activated and said drive gear positioning solenoid deactivated when the brake pedal is engaged and said drive gear positioning solenoid activated and said neutral gear positioning solenoid deactivated when the brake pedal is disengaged.

3. A method for achieving improved fuel economy of a vehicle comprising the steps of:
    providing means for selectively shifting nears of the vehicle when a brake pedal of the vehicle is engaged;
    providing arm having an end portion pivotally coupled to said means for selectively shifting gears;
    providing reciprocating motion means, said reciprocating motion means coupled to said arm for moving said arm when the brake pedal is engaged, said reciprocating motion means comprising at least one actuator for moving said arm when the brake pedal is engaged;
    providing a pair of actuators, said pair of actuators comprising a neutral gear positioning solenoid and a drive gear positioning solenoid;
    activating said neutral gear positioning solenoid and deactivating said drive gear positioning solenoid when the brake pedal is engaged; and
    activating said drive gear positioning solenoid and deactivating said neutral gear positioning solenoid when the brake pedal is disengaged.

* * * * *